(12) United States Patent
Puppala et al.

(10) Patent No.: US 11,582,608 B2
(45) Date of Patent: Feb. 14, 2023

(54) GEOGRAPHICALLY SECURE ACCESS TO CONTAINER CONTROLLER

(71) Applicant: CARRIER CORPORATION, Palm Beach Gardens, FL (US)

(72) Inventors: Chandrasekhar Puppala, Hyderabad (IN); Joshua Varghese, Hyderabad (IN); Phani Pavan Kumar Mangaiahgari, Hyderabad (IN); Ravi Chandra Katari, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/252,773

(22) PCT Filed: Oct. 15, 2019

(86) PCT No.: PCT/US2019/056237
§ 371 (c)(1),
(2) Date: Dec. 16, 2020

(87) PCT Pub. No.: WO2020/096739
PCT Pub. Date: May 14, 2020

(65) Prior Publication Data
US 2021/0120413 A1   Apr. 22, 2021

(30) Foreign Application Priority Data
Nov. 9, 2018   (IN) .............................. 201811042192

(51) Int. Cl.
*G01S 19/42*   (2010.01)
*H04L 9/40*   (2022.01)
(Continued)

(52) U.S. Cl.
CPC ......... *H04W 12/069* (2021.01); *H04L 63/107* (2013.01); *H04W 12/041* (2021.01);
(Continued)

(58) Field of Classification Search
CPC ............... H04W 12/069; H04W 12/61; H04W 12/63; H04W 12/041; H04W 12/08;
(Continued)

(56) References Cited

U.S. PATENT DOCUMENTS 6,384,709 B2   5/2002   Mellen et al.
8,040,218 B2   10/2011   Hays et al.
(Continued)

FOREIGN PATENT DOCUMENTS

CA   2866053 A1   4/2015
WO   2007024988 A2   3/2007
(Continued)

OTHER PUBLICATIONS

International Search Report and Written Opinion for International Application No. PCT/US2019/056237 dated Dec. 6, 2019.
(Continued)

*Primary Examiner* — Techane Gergiso
(74) *Attorney, Agent, or Firm* — Carlson, Gaskey & Olds, P.C.

(57) ABSTRACT

An illustrative example embodiment of a controller associated with a container includes a processor and memory. The controller is configured to generate a derived key based on global positioning system information corresponding to a location of the controller. The controller uses the derived key to authenticate a user device.

19 Claims, 2 Drawing Sheets

(51) Int. Cl.
*H04W 12/041* (2021.01)
*H04W 12/069* (2021.01)
*H04W 12/08* (2021.01)
*H04W 12/61* (2021.01)
*H04W 12/63* (2021.01)
*G06F 3/14* (2006.01)

(52) U.S. Cl.
CPC .......... *H04W 12/08* (2013.01); *H04W 12/61* (2021.01); *G01S 19/42* (2013.01); *G06F 3/14* (2013.01); *H04W 12/63* (2021.01)

(58) Field of Classification Search
CPC ....... H04W 12/06; H04W 4/02; H04W 12/64; H04W 4/027; H04W 4/026; H04W 4/025; H04W 4/029; H04W 12/35; H04W 4/40; H04W 4/44; H04W 88/06; H04L 63/107; H04L 29/06; H04L 9/0872; H04L 63/06; H04L 63/08; H04L 63/12; H04L 67/12; H04L 67/18; G01S 19/42; G01S 19/39; G01S 19/40; G06F 3/14; G06F 2221/2111; G06F 21/44; G06F 21/45; G06Q 10/08; G06Q 50/30; G06Q 10/0833; G06Q 20/308; G06Q 10/083; G06Q 50/28; H04M 2250/10; F25D 2400/38; F25D 2700/12; F25D 2700/14; F25D 29/00; F25D 11/003; A61B 2050/0014; A61B 50/00; G05D 2201/0213; G08C 17/02; H04N 21/42202; H04N 21/4524; B60T 2210/36; B65D 81/18; B65D 81/38

See application file for complete search history.

(56) References Cited

U.S. PATENT DOCUMENTS

| | | | |
|---|---|---|---|
| 8,058,985 B2 | 11/2011 | Dobson et al. | |
| 8,130,077 B2 | 3/2012 | Bates | |
| 8,335,488 B2 | 12/2012 | Despain et al. | |
| 2004/0178880 A1* | 9/2004 | Meyer | G06Q 10/0833 340/5.3 |
| 2004/0257225 A1* | 12/2004 | Webb, Sr. | G08B 25/00 340/539.26 |
| 2005/0044906 A1 | 3/2005 | Spielman | |
| 2005/0179546 A1* | 8/2005 | Lanigan | G07C 9/38 340/584 |
| 2005/0195080 A1* | 9/2005 | Ng | G01S 5/0027 340/686.1 |
| 2005/0232747 A1* | 10/2005 | Brackmann | B60P 3/14 414/803 |
| 2005/0248456 A1* | 11/2005 | Britton | G08B 21/12 340/506 |
| 2006/0181413 A1* | 8/2006 | Mostov | G08B 25/08 340/539.22 |
| 2006/0256961 A1 | 11/2006 | Brainard et al. | |
| 2007/0001855 A1 | 1/2007 | Bohman et al. | |
| 2007/0040647 A1* | 2/2007 | Saenz | H04W 4/40 340/3.1 |
| 2007/0040673 A1* | 2/2007 | Bohine | G01V 5/0016 340/539.26 |
| 2007/0115097 A1 | 5/2007 | Scott et al. | |
| 2008/0297346 A1* | 12/2008 | Brackmann | G01S 19/35 340/572.1 |
| 2009/0115609 A1* | 5/2009 | Weaver | G06Q 10/08 340/572.1 |
| 2011/0128121 A1 | 6/2011 | Shachar et al. | |
| 2012/0159156 A1* | 6/2012 | Barham | G06F 21/604 726/4 |
| 2012/0235791 A1* | 9/2012 | Donlan | G06Q 10/0833 340/10.1 |
| 2013/0335193 A1 | 12/2013 | Hanson et al. | |
| 2013/0347100 A1 | 12/2013 | Tsukamoto et al. | |
| 2014/0317005 A1* | 10/2014 | Balwani | B65D 81/38 705/317 |
| 2015/0348347 A1 | 12/2015 | Diz et al. | |
| 2015/0379796 A1 | 12/2015 | Glasgow et al. | |
| 2016/0191245 A1 | 6/2016 | Qin | |
| 2016/0195602 A1* | 7/2016 | Meadow | G06F 21/6218 701/517 |
| 2018/0308045 A1 | 10/2018 | Arena | |

FOREIGN PATENT DOCUMENTS

| | | |
|---|---|---|
| WO | 2014/176289 A2 | 10/2014 |
| WO | 2017156590 A1 | 9/2017 |

OTHER PUBLICATIONS

Mul-T-Lock next generation of Heavy-duty high security smart Padlock with GPS/GSM Alarm notification, BITLOCK High Security Locking Solutions, Copyright 2018.BITLOCK Pty Ltd, six pages.
International Preliminary Report on Patentability for International application No. PCT/US2019/056237 dated May 20, 2021.
Notice of Reasons for Rejection for JP Application No. 2021-520293 dated Mar. 1, 2022.

* cited by examiner

GEOGRAPHICALLY SECURE ACCESS TO CONTAINER CONTROLLER

BACKGROUND

Intermodal shipping containers are in widespread use for transporting a variety of items. An advantage of such containers is that they can be used by different carriers without unloading the contents of the container. For example, the same container can be loaded, placed onto a truck, carried to a shipping port, removed from the truck and placed onto a ship that carries the still-loaded container to another location. Other transporting scenarios are possible with such containers.

Some shipping containers, such as those mentioned above, include systems for preserving perishable items. For example, some containers include a refrigeration circuit for providing air conditioning or refrigeration within the container. Depending on the transportation specifics, it may be necessary to adjust the operation of such a system at one or more times between when the container is first loaded and when it reaches its final destination. In many instances multiple containers are stacked on top of one another and multiple stacks are arranged very close to each other so that direct access to at least some of the containers is not practical or possible. Without direct access to a container, there is a need for an alternative way of adjusting or controlling operation of an in-container system, such as a refrigeration system.

One challenge associated with providing such control is maintaining security over access to the system and its controls to ensure proper conditions for the contents of the container. Another challenge is giving different authorized individuals appropriate access at various times and locations along the travel route of the container. There is a need for an efficient and secure way to observe and adjust the operation of such on-board or in-container systems.

SUMMARY

An illustrative example controller associated with a container includes a processor and memory associated with the processor. The controller is configured to determine a derived key based on global positioning system information corresponding to a location of the controller. The controller is configured to determine an expected communication pass key based on the derived key. The controller is configured to determine whether a user device is authorized based on a received communication pass key from the user device that corresponds to the expected communication pass key. The controller is configured to allow the user device access to at least one functionality of the controller when the user device is authorized.

In an example embodiment having one or more features of the previous paragraph, the global positioning system information includes a current time and a current location of the controller, and the derived key is based on the current time and the current location.

In an example embodiment having one or more features of the controller of any of the previous paragraphs, the controller is configured to generate a communication session token that has an expiration time. The communication session token is used by the user device for communicating with the controller. The derived key is valid for a predetermined period and the expiration time is before an end of the predetermined period.

In an example embodiment having one or more features of the controller of any of the previous paragraphs, the at least one functionality includes setting a target temperature for at least a portion of an interior of the container.

In an example embodiment having one or more features of the controller of any of the previous paragraphs, the controller is configured to control a display to provide a visual indication of the derived key.

In an example embodiment having one or more features of the controller of any of the previous paragraphs, at least one of the controller or the container has a serial number. The controller is configured to determine whether the user device is authorized based on receiving the serial number of the at least one of the controller or the container from the user device.

In an example embodiment having one or more features of the controller of any of the previous paragraphs, the controller is configured to determine whether the user device is authorized based on receiving a user certificate from the user device.

An illustrative example method of managing communications between a controller associated with a container device includes determining a derived key based on global positioning system information corresponding to a location of the controller, determining an expected communication pass key based on the derived key, determining whether the user device is authorized based on a received communication pass key from the user device corresponding to the expected communication pass key, and allowing the user device access to at least one functionality of the controller when the user device is authorized.

In an example embodiment having one or more features of the method of any of the previous paragraphs, the global positioning system information includes a current time and a current location of the controller and the derived key is based on the current time and the current location.

An example embodiment having one or more features of the method of any of the previous paragraphs includes generating a communication session token that is used by the user device for communicating with the controller, the communication session token having an expiration time. The derived key is valid for a predetermined period and the expiration time is before an end of the predetermined period.

In an example embodiment having one or more features of the method of any of the previous paragraphs, the at least one functionality includes setting a target temperature for at least a portion of an interior of the container.

In an example embodiment having one or more features of the method of any of the previous paragraphs, at least one of the controller or the container has a serial number and the method comprises determining whether the user device is authorized based on receiving the serial number of the at least one of the controller or the container from the user device.

An example embodiment having one or more features of the method of any of the previous paragraphs includes determining whether the user device is authorized based on receiving a user certificate from the user device.

An illustrative example system includes, among other things, a plurality of containers, a plurality of controllers, each of the controllers being associated with a respective one of the containers and a plurality of refrigerant circuits, each of the refrigerant circuits being associated with a respective one of the containers, each of the refrigerant circuits being controllable by the controller on the respective container. A user device is configured for wireless communication with the plurality of controllers, respectively. Each of the controllers is configured to determine a derived key based on global positioning system information corresponding to a location of the plurality of containers, determine an expected communication pass key based on the derived key, determine whether the user device is authorized based on receiving a communication pass key from the user device that corresponds to the expected communication pass key, and allow the user device access to at least one functionality of the controller when the user device is authorized.

In an example embodiment having one or more features of the system of the previous paragraph, the global positioning system information includes a current time and a current location of the controller and the derived key is based on the current time and the current location.

In an example embodiment having one or more features of the system of either of the previous paragraphs, the at least one functionality includes setting a target temperature for at least a portion of an interior of the respective container.

In an example embodiment having one or more features of the system of any of the previous paragraphs, a display is supported on at least one of the containers, the display being controllable by the controller of the respective container, the display providing a visual indication of the derived key.

In an example embodiment having one or more features of the system of any of the previous paragraphs, each of the controllers is configured to generate a communication session token that has an expiration time, the communication session token is used by the user device for communicating with each controller, the derived key is valid for a predetermined period and the expiration time is before and end of the predetermined period.

In an example embodiment having one or more features of the system of any of the previous paragraphs, each controller is configured to determine whether the user device is authorized based on receiving at least one of a serial number of the controller or a serial number of the respective container associated with the controller from the user device, or each controller is configured to determine whether the user device is authorized based on receiving a user certificate from the user device.

The various features and advantages of at least one disclosed example embodiment will become apparent to those skilled in the art from the following detailed description. The drawings that accompany the detailed description can be briefly described as follows.

DETAILED DESCRIPTION

Figure 1:
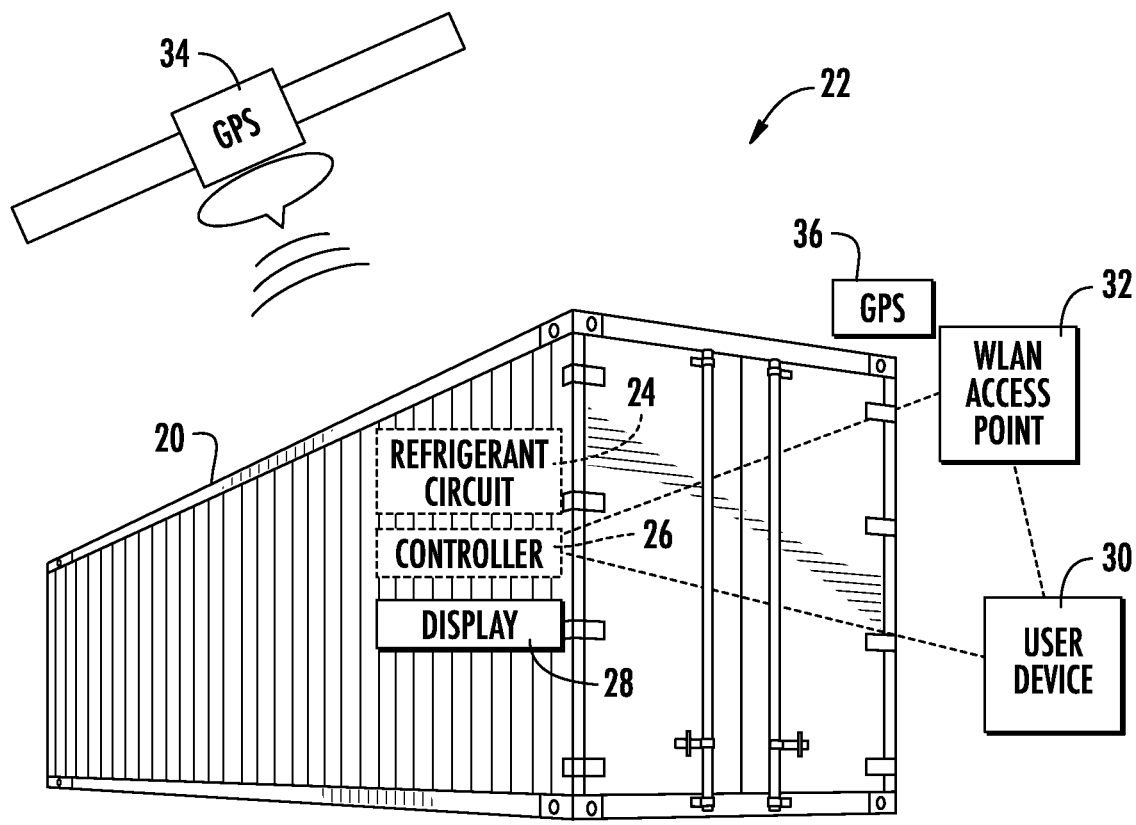
FIG. 1 schematically illustrates selected portions of a system designed according to an embodiment of this invention including a controller associated with a container.

FIG. 1 illustrates a container 20 that is part of a system 22 for communicating with and selectively controlling a device associated with a container 20. The illustrated example container 20 is an intermodal container that can be loaded and transferred among different carriers during a transportation cycle. Other types of containers may be used in the system 22.

The example container 20 has an associated refrigerant circuit 24 that provides refrigeration or temperature control for at least a portion of the interior of the container 20. The refrigerant circuit 24 operates in a generally known manner.

A controller 26 associated with the container 20 is configured to control operation of the refrigerant circuit 24, such as by setting a target temperature for the space within the container 20 where temperature control is desired. The controller 26 controls a display 28 supported on the container 20. In this example, the display 28 is visible from outside of the container 20.

The controller 26 is configured to communicate with a user device 30 that allows for an authorized individual to access at least one functionality of the controller 26. For example, the user device 30 may be used by an authorized individual to set a target temperature within the container 20 so that the controller 26 controls operation of the refrigerant circuit 24 to achieve that temperature within the container 20. The user device 30 may also obtain information from the controller 26 regarding conditions within the container 20. Depending on the type of container 20 and any controllable devices supported on the container 20, the functionality of the controller 26 that is accessible or controllable through the user device 30 will vary. Those skilled in the art who have the benefit of this description will realize how to configure a controller 26 and user device 30 to provide appropriate control features to meet their particular needs.

The example controller 26 is configured to communicate with the user device 30 over a wireless link. Example implementations include close range wireless communications such as Wi-Fi, Bluetooth or Zigbee communications. In some examples, the controller 26 and user device 30 will communicate directly with each other. In other embodiments, such as the example shown in FIG. 1, each of the controller 26 and user device 30 is configured to communicate through a wireless local area network 32. Each of the user device 30 and controller 26 may communicate with an access point of the local area network 32 using known communication protocols.

One feature of the controller 26 is that it utilizes global positioning system (GPS) information for purposes of controlling communications with the user device 30 to maintain security over the functionality of the controller 26, operation of the refrigerant circuit 24 and the condition of the contents within the container 20. In the example of FIG. 1, the controller 26 has the capability of communicating with a GPS system 34 to obtain information regarding the location of the controller 26, which corresponds to a location of the container 20. The controller 26 in this example also uses information regarding a current time from the GPS system 34. For situations in which the controller 26 is unable to obtain a GPS signal directly, the wireless local area network includes a GPS receiver 36 that is situated in a location where access to GPS signaling is expected. The controller 26 may obtain GPS location and time information through the local area network in this embodiment.

Although not specifically illustrated, the system 22 includes a plurality of containers 20 each having its own associated controller 26. The user device 30 may communicate with each of those controllers to individually control the respective refrigerant circuits 24 or other devices on board the respective containers 20.

Figure 2:
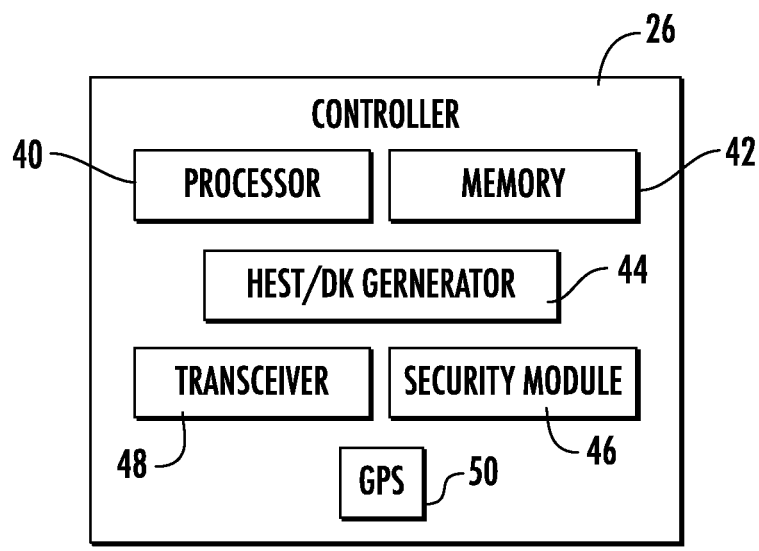
FIG. 2 schematically illustrates a controller designed according to an embodiment of this invention.

As shown in FIG. 2, the controller 26 includes a processor 40 and memory 42 associated with the processor 40. In the illustrated example, the processor 40 comprises at least one hardware device. The memory 42 may be part of the same hardware device or a separate component. The memory 42 includes software code or instructions that cause the processor 40 to perform the functions of the controller 26 mentioned in this description.

A high entropy security token (HEST) or derived key (DK) generator module 44 includes software, firmware or both that, when executed by the processor 40, generates a derived key that is useful for secure communication with the user device 30. The controller 26 also includes a security module 46 to maintain security over access to the functionality of the controller 26 and security over communications with the user device 30, for example. A transceiver 48 allows the controller 26 to communicate over a wireless link, for example, with a local area network or the user device 30. In this example, the controller 26 has a GPS module 50 that allows the controller 26 to receive GPS information, such as a current time and current location. In this example, the GPS module 50 includes a GPS receiver capable of directly receiving GPS signals from the GPS system 34. In the event that the GPS receiver is incapable of directly receiving GPS signals, the controller 26 obtains GPS information through a local area network, including another GPS receiver 36, such as that described above.

Figure 3:
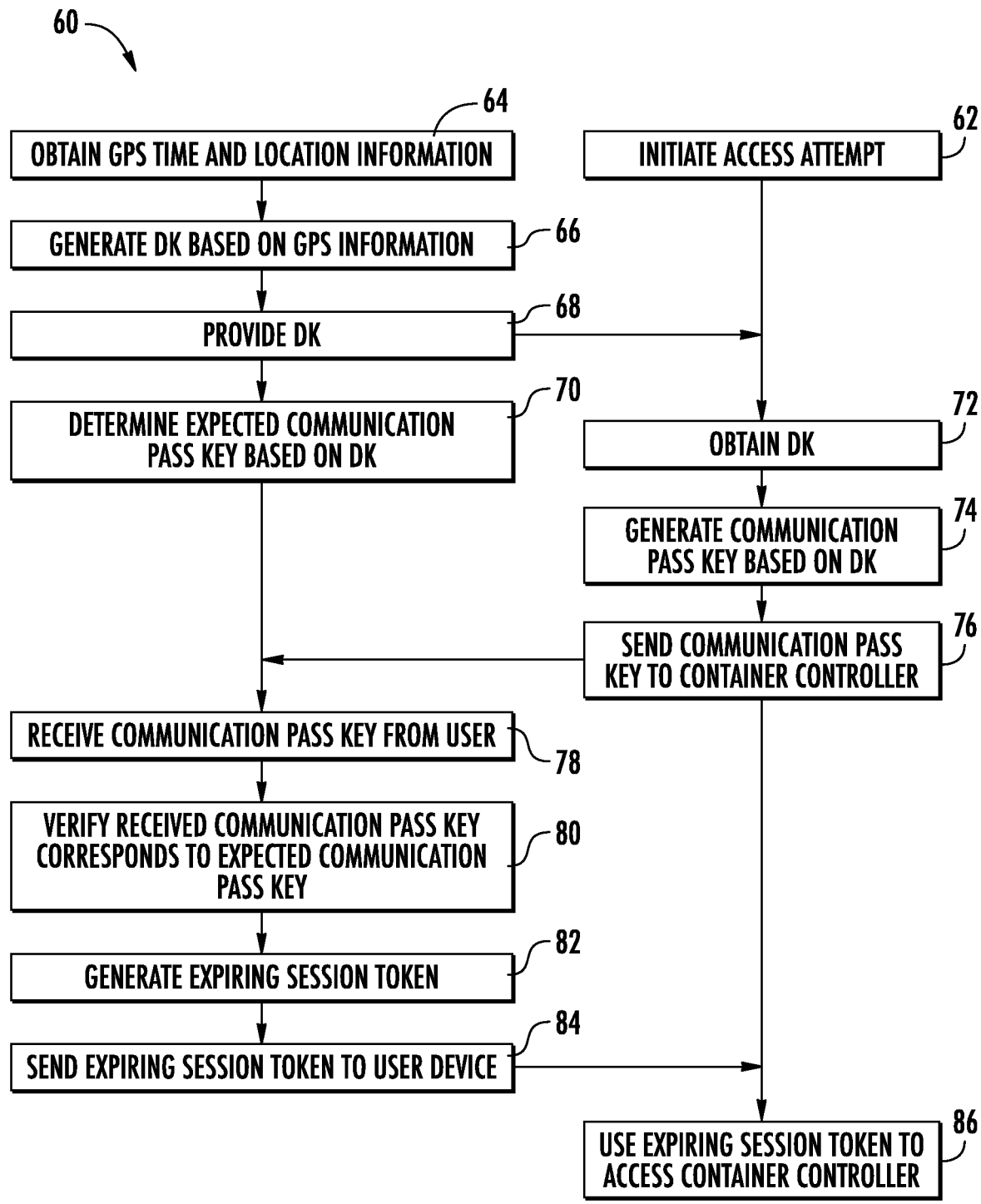
FIG. 3 is a flow chart diagram summarizing an example communication control strategy designed according to an embodiment of this invention.

FIG. 3 is a flowchart diagram 60 summarizing an example approach to maintaining security over communications with the controller 26 and maintaining security over the operation or functionality of the controller 26. In FIG. 3, the functions or operations shown on the left side are performed by the controller 26 while those shown on the right side are performed by the user device 30. In this example, an authorized individual uses the user device 30 to initiate an access attempt because the individual desires to obtain information from the controller 26 regarding the interior of the container 20 or otherwise desires to control some functionality of the controller 26. At 64, the controller 26 obtains GPS time and location information. In some embodiments, the controller 26 will obtain GPS time and location information on an ongoing basis. In other embodiments, the user's access attempt instigates a wakeup signal to the controller 26 at which time the controller 26 responds by obtaining the GPS time and location information at 64.

At 66, the controller 26 generates a derived key based on the GPS information. A known derivation algorithm is used in some embodiments. For example, the derived key generator module 44 includes an Argon2 algorithm. The generated derived key has a limited time during which it is valid. Generating the derived key based on GPS information provides enhanced security over the controller 26 and the conditions for any contents within the container 20. Such a derived key is more secure than a password that remains constant over a prolonged period of time.

At 68, the controller 26 provides the derived key to the user device 30. This may occur through a direct communication with the user device 30 over a wireless link or through a wireless local area network that the controller 26 and user device 30 both can access. In the example of FIG. 1, the controller 26 controls the display 28 to show the derived key. An authorized individual may see the derived key and enter it into the user device 30.

The security module 46 determines an expected communication pass key based on the derived key at 70. At 72, the user device 30 obtains the derived key from the controller 26. The user device 30 generates a communication pass key based on the derived key at 74. For example, the user device 30 is provided with a software application that has appropriate derivation programming for generating a communication pass key based on the derived key. At 76, the user device 30 sends the communication pass key to the controller 26.

At 78, the transceiver 48 of the controller 26 receives the communication pass key from the user device 30. At 80, the security module 46 verifies that the received communication pass key corresponds to the expected communication pass key that was determined at 70. Once the verification of the communication pass key is complete, the security module 46 determines that the controller 26 can be accessed by the individual utilizing the user device 30. In other words, the controller 26 determines whether an individual user using the user device 30 is authorized to gain access to the controller 26 for purposes of obtaining information from the controller 26 or accessing at least one functionality of the controller 26 for purposes of maintaining control over the environment within the container 20.

In the example of FIG. 3, the controller 26 generates an expiring session token at 82. At 84, the transceiver 48 communicates the expiring session token to the user device 30. At 86, the user device 30 utilizes the expiring session token to communicate with the controller 26. In some embodiments, the session token has an expiration time that occurs before the derived key will expire. This allows an authorized user to communicate with the controller 26 on one container 20 and then use the same derived key for communicating with another controller 26 on another container 20 in the same location. Keeping the derived key active or authorized for a period of time longer than a typical expected communication session for any individual controller 26 allows an authorized individual to conveniently gain access to multiple controllers 26 associated with respective containers 20 in a particular location without having to obtain another derived key. In some embodiments, the derived key is valid for several hours.

In the illustrated example embodiment, the controller 26 controls the display 28 to provide a visual indication of the derived key that is visible from outside of the container 20. This allows an authorized individual, for example, to observe the derived key and enter it into an appropriate application on the user device 30. For situations in which multiple containers 20 are stacked on top of each other and close together, an authorized user only needs to observe a single display 28 at a particular location to obtain a derived key that is useful for communicating with all controllers 26 in that location. When the containers 20 are within a secured location, such as on board a cargo ship or within a storage facility, the visible derived key on the display 28 will only be available to individuals who gain access to such a secured location.

Utilizing GPS information for generating the derived key allows for utilizing time and location information for the token generation. This combination of information provides a more secure and more reliable token generation compared to an arrangement that would rely upon an internal clock, for example, of the controller 26. Wherever a GPS signal is available, the type of secure communication described above becomes possible.

Additionally, with the derived key being based at least in part on location information, it is not possible for an individual in one location to obtain a derived key and then share that with another individual in a remote location or outside of a secured location, for example. The derived key based on location information is specific to a container 20 or set of containers 20 in a particular location, which enhances security over access to controllers that may be spread over wide geographic regions.

The disclosed example embodiment facilitates maintaining security and control over operation of a system or device, such as a refrigerant circuit 24 to ensure desired conditions inside of a container under a variety of circumstances. Even in situations where multiple containers are stacked on top of each other and very close together, an authorized individual may obtain a derived key from one controller 26 or display 28 at that location and use that derived key for communicating with multiple controllers on different containers at that location.

In some embodiments, the user device 30 includes a user certificate obtained when an authorized individual downloads or otherwise installs an appropriate application onto the device 30 that allows the user device 30 to be useful for communicating with one or more controllers 26. There are a variety of known ways of obtaining or generating a user certificate indicating an authorized user device. In such embodiments, the controller 26 determines whether an appropriate user certificate has been received from a particular user device 30 that is attempting to gain access to or otherwise communicate with the controller 26.

In some embodiments, each container 20 has a serial number and each controller 26 has a serial number. An authorized individual will be provided with information regarding such serial numbers. During an attempted communication session with the controller 26, the user device 30 provides an indication of the controller serial number, the container serial number or both as part of the authentication process. Including this feature ensures that an individual not only has to obtain a valid derived key but has to have been pre-authorized for access to specific controllers or containers.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A controller associated with a container, the controller comprising a processor and memory associated with the processor, the controller being configured to:
    determine a derived key based on global positioning system information corresponding to a location of the controller;
    determine an expected communication pass key based on the derived key;
    determine whether a user device is authorized based on a received communication pass key from the user device corresponding to the expected communication pass key; and
    allow the user device access to at least one functionality of the controller when the user device is authorized.

2. The controller of claim 1, wherein
    the global positioning system information includes a current time and a current location of the controller; and
    the derived key is based on the current time and the current location.

3. The controller of claim 1, wherein
    the controller is configured to generate a communication session token that has an expiration time;
    the communication session token is used by the user device for communicating with the controller;
    the derived key is valid for a predetermined period; and
    the expiration time is before an end of the predetermined period.

4. The controller of claim 1, wherein
    the at least one functionality includes setting a target temperature for at least a portion of an interior of the container.

5. The controller of claim 1, wherein the controller is configured to control a display to provide a visual indication of the derived key.

6. The controller of claim 1, wherein
    at least one of the controller or the container has a serial number; and
    the controller is configured to determine whether the user device is authorized based on receiving the serial number of the at least one of the controller or the container from the user device.

7. The controller of claim 1, wherein
    the controller is configured to determine whether the user device is authorized based on receiving a user certificate from the user device.

8. A method of managing communications between a controller associated with a container and a user device, the method comprising:
    determining a derived key based on global positioning system information corresponding to a location of the controller;
    determining an expected communication pass key based on the derived key;
    determining whether the user device is authorized based on a received communication pass key from the user device corresponding to the expected communication pass key; and
    allowing the user device access to at least one functionality of the controller when the user device is authorized.

9. The method of claim 8, wherein
    the global positioning system information includes a current time and a current location of the controller; and
    the derived key is based on the current time and the current location.

10. The method of claim 8, comprising
    generating a communication session token that is used by the user device for communicating with the controller, the communication session token having an expiration time;
    and wherein
    the derived key is valid for a predetermined period; and
    the expiration time is before an end of the predetermined period.

11. The method of claim 8, wherein
    the at least one functionality includes setting a target temperature for at least a portion of an interior of the container.

12. The controller of claim 8, wherein at least one of the controller or the container has a serial number and the method comprises determining whether the user device is authorized based on receiving the serial number of the at least one of the controller or the container from the user device.

13. The method of claim 8, comprising determining whether the user device is authorized based on receiving a user certificate from the user device.

14. A system, comprising:
    a plurality of containers;
    a plurality of controllers, each of the controllers being associated with a respective one of the containers;

a plurality of refrigerant circuits, each of the refrigerant circuits being associated with a respective one of the containers, each of the refrigerant circuits being controllable by the controller on the respective container; and a user device configured for wireless communication with the plurality of controllers, respectively, wherein each of the controllers is configured to determine a derived key based on global positioning system information corresponding to a location of the respective one of the containers, determine an expected communication pass key based on the derived key, determine whether the user device is authorized based on receiving a communication pass key from the user device that corresponds to the expected communication pass key, and allow the user device access to at least one functionality of the controller when the user device is authorized.

15. The system of claim 14, wherein the global positioning system information includes a current time and a current location of the controller; and the derived key is based on the current time and the current location.

16. The system of claim 14, wherein the at least one functionality includes setting a target temperature for at least a portion of an interior of the respective container.

17. The system of claim 14, comprising a display supported on at least one of the containers, the display being controllable by the controller of the respective container, the display providing a visual indication of the derived key.

18. The system of claim 14, wherein each of the controllers is configured to generate a communication session token that has an expiration time;

the communication session token generated by one of the controllers is used by the user device for communicating with the one of the controllers;

the derived key is valid for a predetermined period; and the expiration time is before and end of the predetermined period.

19. The system of claim 14, wherein each controller is configured to determine whether the user device is authorized based on receiving at least one of a serial number of the controller and a serial number of the respective container associated with the controller from the user device; or each controller is configured to determine whether the user device is authorized based on receiving a user certificate from the user device.

* * * * *